United States Patent
Ativanichayaphong et al.

(10) Patent No.: US 8,086,463 B2
(45) Date of Patent: Dec. 27, 2011

(54) DYNAMICALLY GENERATING A VOCAL HELP PROMPT IN A MULTIMODAL APPLICATION

(75) Inventors: Soonthorn Ativanichayaphong, Boca Raton, FL (US); Charles W. Cross, Jr., Wellington, FL (US); David Jaramillo, Lake Worth, FL (US); Yan Li, Boynton Beach, FL (US)

(73) Assignees: Nuance Communications, Inc., Burlington, MA (US); International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/530,930

(22) Filed: Sep. 12, 2006

(65) Prior Publication Data
US 2008/0065390 A1   Mar. 13, 2008

(51) Int. Cl.
*G10L 21/00* (2006.01)
*G10L 21/06* (2006.01)
(52) U.S. Cl. ............ 704/275; 704/270; 704/270.1
(58) Field of Classification Search ........... 704/270–275
See application file for complete search history.

(56) References Cited

U.S. PATENT DOCUMENTS

| | | | |
|---|---|---|---|
| 5,020,107 A * | 5/1991 | Rohani et al. ............. | 704/275 |
| 5,040,127 A * | 8/1991 | Gerson .................... | 704/255 |
| 5,397,385 A * | 3/1995 | Watts ..................... | 106/18.32 |
| 5,577,165 A | 11/1996 | Takebayashi et al. | |
| 5,584,052 A | 12/1996 | Gulau et al. | |
| 5,724,406 A * | 3/1998 | Juster ..................... | 379/88.13 |
| 5,819,029 A * | 10/1998 | Edwards et al. ........... | 726/2 |
| 5,860,059 A * | 1/1999 | Aust et al. ............... | 704/231 |
| 5,937,385 A * | 8/1999 | Zadrozny et al. .......... | 704/257 |
| 5,969,717 A | 10/1999 | Ikemoto | |
| 6,070,241 A * | 5/2000 | Edwards et al. ........... | 726/2 |
| 6,173,261 B1 * | 1/2001 | Arai et al. ............... | 704/257 |
| 6,208,972 B1 | 3/2001 | Grant et al. | |
| 6,243,375 B1 | 6/2001 | Speicher | |
| 6,275,806 B1 | 8/2001 | Pertrushin | |

(Continued)

FOREIGN PATENT DOCUMENTS

CN         1385783         12/2002

(Continued)

OTHER PUBLICATIONS

U.S. Appl. No. 10/919,005, filed Dec. 2005, Eichenberger, et al.

(Continued)

*Primary Examiner* — Eric Yen
(74) *Attorney, Agent, or Firm* — Wolf, Greenfield & Sacks, P.C.

(57) ABSTRACT

Dynamically generating a vocal help prompt in a multimodal application that include detecting a help-triggering event for an input element of a VoiceXML dialog, where the detecting is implemented with a multimodal application operating on a multimodal device supporting multiple modes of interaction including a voice mode and one or more non-voice modes, the multimodal application is operatively coupled to a VoiceXML interpreter, and the multimodal application has no static help text. Dynamically generating a vocal help prompt in a multimodal application according to embodiments of the present invention typically also includes retrieving, by the VoiceXML interpreter from a source of help text, help text for an element of a speech recognition grammar, forming by the VoiceXML interpreter the help text into a vocal help prompt, and presenting by the multimodal application the vocal help prompt through a computer user interface to a user.

15 Claims, 6 Drawing Sheets

U.S. PATENT DOCUMENTS

| | | |
|---|---|---|
| 6,301,560 B1 | 10/2001 | Masters |
| 6,374,226 B1* | 4/2002 | Hunt et al. .................. 704/275 |
| 6,456,978 B1* | 9/2002 | Wymore et al. .............. 704/275 |
| 6,513,011 B1 | 1/2003 | Uwakubo |
| 6,574,601 B1* | 6/2003 | Brown et al. ............. 704/270.1 |
| 6,606,599 B2 | 8/2003 | Grant et al. |
| 6,760,704 B1* | 7/2004 | Bennett ...................... 704/270 |
| 6,856,960 B1 | 2/2005 | Dragosh et al. |
| 6,920,425 B1 | 7/2005 | Will et al. |
| 6,999,930 B1 | 2/2006 | Roberts et al. |
| 7,031,925 B1* | 4/2006 | Goldberg ..................... 704/275 |
| 7,035,805 B1 | 4/2006 | Miller |
| 7,058,890 B2* | 6/2006 | George et al. ................ 715/728 |
| 7,149,688 B2* | 12/2006 | Schalkwyk ................... 704/255 |
| 7,150,399 B2 | 12/2006 | Barrus et al. |
| 7,171,243 B2 | 1/2007 | Watanabe et al. |
| 7,188,067 B2 | 3/2007 | Grant et al. |
| 7,197,494 B2* | 3/2007 | Wang et al. .................. 707/705 |
| 7,330,890 B1 | 2/2008 | Partovi et al. |
| 7,376,586 B1 | 5/2008 | Partovi et al. |
| 7,444,285 B2* | 10/2008 | Forbes ........................ 704/235 |
| 7,487,085 B2 | 2/2009 | Cross |
| 7,627,476 B2* | 12/2009 | Nanavati et al. ........... 704/270.1 |
| 7,653,545 B1* | 1/2010 | Starkie ........................ 704/275 |
| 7,712,031 B2* | 5/2010 | Law et al. .................... 715/728 |
| 2001/0016813 A1* | 8/2001 | Brown et al. ................ 704/231 |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0061024 A1* | 3/2003 | Martin ............................ 704/4 |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0117804 A1* | 6/2004 | Scahill et al. ................. 719/320 |
| 2004/0120472 A1 | 6/2004 | Popay et al. |
| 2004/0120476 A1 | 6/2004 | Harrison et al. |
| 2004/0138890 A1 | 7/2004 | Farrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kujirai |
| 2005/0075884 A1* | 4/2005 | Badt, Jr. ........................ 704/275 |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0144187 A1* | 6/2005 | Che et al. ...................... 707/101 |
| 2005/0154580 A1 | 7/2005 | Horowitz et al. |
| 2005/0160461 A1 | 7/2005 | Baumgartner et al. |
| 2005/1888412 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" INTERNET, [Online] Jun. 13 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: $7^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

* cited by examiner

DYNAMICALLY GENERATING A VOCAL HELP PROMPT IN A MULTIMODAL APPLICATION

BACKGROUND OF THE INVENTION

1. Field of the Invention

The field of the invention is data processing, or, more specifically, methods, apparatus, and products for dynamically generating a vocal help prompt in a multimodal application.

2. Description Of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

Incorporating speech into web application leads users to expect a multimodal application to provide help in voice mode as well as visual mode. Typically in prior art vocal help prompts are hard-coded by programmers at application development time. In VoiceXML, for example, the <catch event="help"> element is an event handler that defines what to do when a user asks for help. Vocal help prompts can be tapered to provide different vocal help prompts on subsequent help requests. And VoiceXML help handlers can be abbreviated, so that the following two VoiceXML elements are equivalent:

```
<catch event="help">
    Please say visa, mastercard, or amex.
</catch>
<help>
    Please say visa, mastercard, or amex.
</help>
```

In current art, vocal help prompts are hard-coded by programmers at application development time. Many grammars or grammar elements, however, are dynamically generated rather than hard coded. Grammars for airline schedules containing dates, flight times, destinations, and so on, for example, may change daily or hourly, so that the contents of such grammars are typically generated by automation from data in databases rather than being hard coded by programmers. This makes it very difficult to hard code appropriate vocal help prompts for use in systems that rely on such dynamically-generated grammars.

SUMMARY OF THE INVENTION

Methods, apparatus, and computer program products are described for dynamically generating a vocal help prompt in a multimodal application that include detecting a help-triggering event for an input element of a VoiceXML dialog, where the detecting is implemented with a multimodal application operating on a multimodal device supporting multiple modes of interaction including a voice mode and one or more non-voice modes, the multimodal application is operatively coupled to a VoiceXML interpreter, and the multimodal application has no static help text. Dynamically generating a vocal help prompt in a multimodal application according to embodiments of the present invention typically also includes retrieving, by the VoiceXML interpreter from a source of help text, help text for an element of a speech recognition grammar, forming by the VoiceXML interpreter the help text into a vocal help prompt, and presenting by the multimodal application the vocal help prompt through a computer user interface to a user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
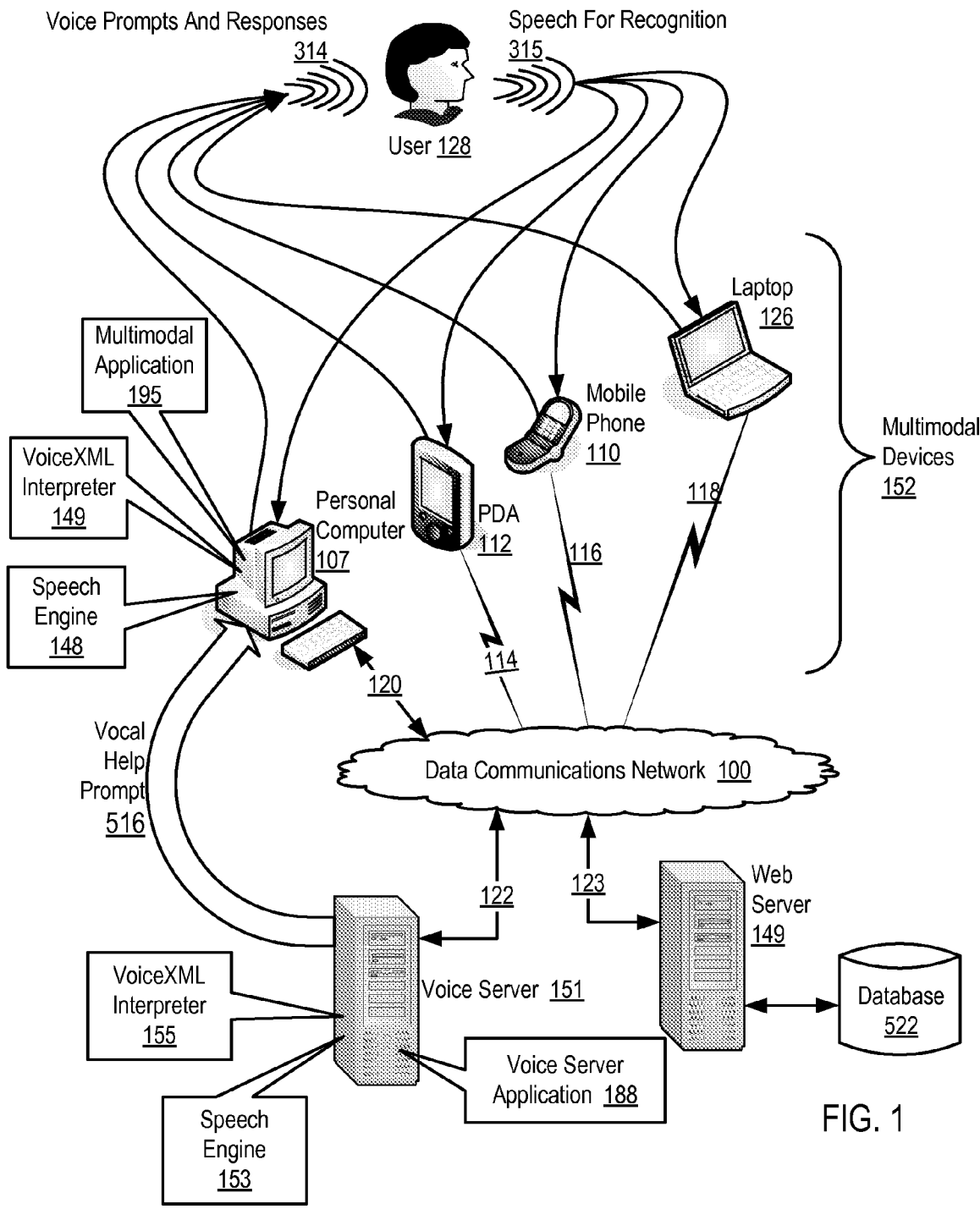
FIG. 1 sets forth a network diagram illustrating an exemplary system for dynamically generating a vocal help prompt in a multimodal application according to embodiments of the present invention.

Exemplary methods, apparatus, and products for dynamically generating a vocal help prompt in a multimodal application according to embodiments of the present invention are described with reference to the accompanying drawings, beginning with FIG. 1. FIG. 1 sets forth a network diagram illustrating an exemplary system for dynamically generating a vocal help prompt in a multimodal application according to embodiments of the present invention. The system of FIG. 1 operates generally to dynamically generate a vocal help prompt in a multimodal application according to embodiments of the present application by detecting a help-triggering event for an input element of a VoiceXML dialog; retrieving, by the VoiceXML interpreter from a source of help text, help text for an element of a speech recognition grammar; forming by the VoiceXML interpreter the help text into a vocal help prompt; and presenting by the multimodal application the vocal help prompt through a computer user interface to a user. Detecting a help-triggering event is carried out with a multimodal application operating on a multimodal device supporting multiple modes of interaction including a voice mode and one or more non-voice modes. The multimodal application is operatively coupled to a VoiceXML interpreter. The multimodal application typically has no static help text.

A help-triggering event is any XML Events event for which an event handler generates a vocal help prompt. Examples of help-triggering events include:
  a 'help' event, detected when a user requests help,
  a 'nomatch' event, detected when a user presents speech input, but the speech fails to match any active grammar, and
  a 'noinput' event, detected when a user presents no speech input for a specified period of time.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:
  personal computer (107) which is coupled for data communications to data communications network (100) through wireline connection (120),
  personal digital assistant ('PDA') (112) which is coupled for data communications to data communications network (100) through wireless connection (114),
  mobile telephone (110) which is coupled for data communications to data communications network (100) through wireless connection (116), and
  laptop computer (126) which is coupled for data communications to data communications network (100) through wireless connection (1 18).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202

050 Advanced DSR Front-end Codec, the ETSI ES 202 211 Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for dynamically generating a vocal help prompt in a multimodal application according to embodiments of the present invention may be encoded with any codec, including, for example:

- AMR (Adaptive Multi-Rate Speech coder)
- ARDOR (Adaptive Rate-Distortion Optimized sound codeR),
- Dolby Digital (A/52, AC3),
- DTS (DTS Coherent Acoustics),
- MP1 (MPEG audio layer-1),
- MP2 (MPEG audio layer-2) Layer 2 audio codec (MPEG-1, MPEG-2 and non-ISO MPEG-2.5),
- MP3 (MPEG audio layer-3) Layer 3 audio codec (MPEG-1, MPEG-2 and non-ISO MPEG-2.5),
- Perceptual Audio Coding,
- FS-1015 (LPC-10),
- FS-1016 (CELP),
- G.726 (ADPCM),
- G.728 (LD-CELP),
- G.729 (CS-ACELP),
- GSM,
- HILN (MPEG-4 Parametric audio coding), and
- others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user, including vocal help prompts. The VoiceXML interpreter administers such dialogs by processing the dialog instructions sequentially in accordance with a VoiceXML Form Interpretation Algorithm ('FIA'). The VoiceXML interpreter and its FIA in this example are improved to support dynamically generating a vocal help prompt in a multimodal application according to embodiments of the present invention by detecting a help-triggering event for an input element of a VoiceXML dialog; retrieving, from a source of help text, help text for an element of a speech recognition grammar; forming the help text into a vocal help prompt; and presenting the vocal help prompt through a computer user interface to a user.

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application.

The VoiceXML interpreter provides grammars, speech for recognition, and text for speech synthesis to the speech engine, and the VoiceXML interpreter returns to the multimodal application speech engine output in the form of recognized speech, semantic interpretation results, and digitized speech for voice prompts, including dynamically generated vocal help prompts according to embodiments of the present invention. When in a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention.

Each of the example multimodal devices (152) in the system of FIG. 1 may be configured to dynamically generate a vocal help prompt in a multimodal application according to embodiments of the present invention by detecting a help-triggering event for an input element of a VoiceXML dialog; retrieving, by the VoiceXML interpreter from a source of help text, help text for an element of a speech recognition grammar; forming by the VoiceXML interpreter the help text into a vocal help prompt; and presenting by the multimodal application the vocal help prompt through a computer user interface to a user. Detecting a help-triggering event is carried out with a multimodal application operating on a multimodal device supporting multiple modes of interaction including a voice mode and one or more non-voice modes. The multimodal application is operatively coupled to a VoiceXML interpreter. The multimodal application typically has no static help text.

Text for use as help text in dynamically generating a voice help prompt can be retrieved from text associated with elements of the grammar, including non-terminal elements and terminal elements. The grammar elements form a tree structure, and non-terminal elements and terminal elements of a grammar are grammar elements represented as nodes in a grammar tree structure. The non-terminal elements represent branch nodes, and the terminal elements represent leaf nodes. The help text can be retrieved from the grammar itself (remembering that none of the text in the grammar is specified by hard code as static help text), or help text can be retrieved from a database from which the grammar was dynamically generated. Help text so retrieved can be formed into a vocal help prompt by concatenating help text associated with a non-terminal element of the grammar with help text associated with one or more terminal elements of the grammar.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for dynamically generating a vocal help prompt in a multimodal application according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for dynamically generating a vocal help prompt in a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 includes a web server (149) connected for data communications through wireline connection (123) to network (100) and therefore to the multimodal devices (152). The web server (149) may be any server that provides to client devices markup documents that compose multimodal applications. The web server (149) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (149) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (149), the voice server (151), and the data communications network (100) making up the exemplary system illustrated in FIG. 1 are for explanation, not for limitation. Data processing systems useful for dynamically generating a vocal help prompt in a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Figure 2:
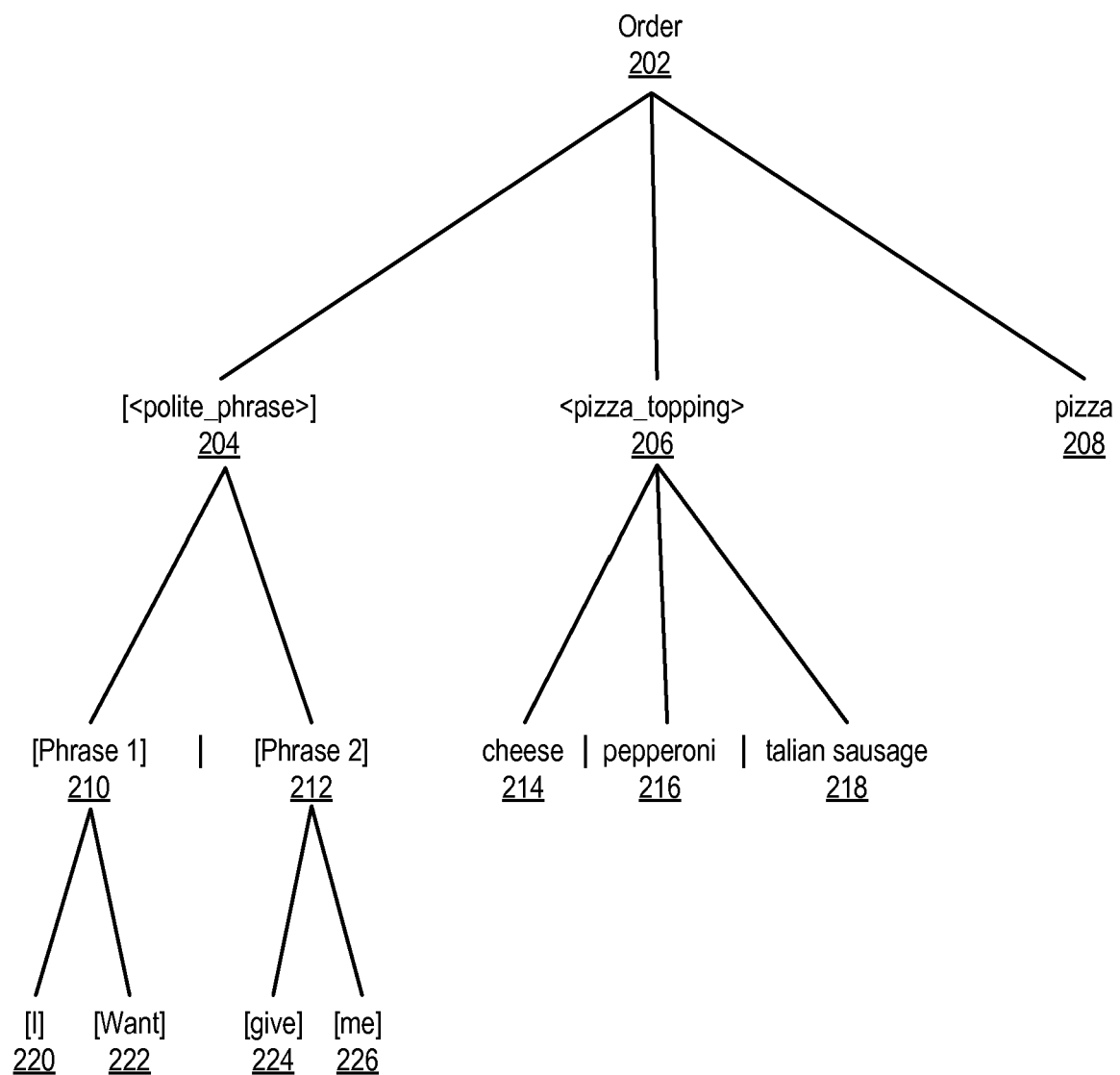
FIG. 2 sets forth a chart illustrating an example speech recognition grammar as a tree structure.

For further explanation, FIG. 2 sets forth a chart illustrating an example speech recognition grammar as a tree structure. The following example is a grammar that supports ordering pizza, with the grammar expressed in Java Speech Grammar Format ('JSGF'):

--- order = [<polite_phrase>] <pizza_topping> pizza
pizza_topping = cheese | pepperoni | "italian sausage"
polite_phrase = [I][want] | [give] [me]

---

The example of FIG. 2 maps the elements of the 'order' grammar into a tree structure with the 'order' element (202) at the root of the tree. The terms 'order,' 'pizza_topping,' and 'polite_phrase' specify rules of the grammar. Grammar elements in angled brackets < >, <polite_phrase> (204) and <pizza topping> (206), are references to rules of the grammar, also called non-terminals, because they represent branch nodes in the tree structure of the grammar that expand into further branch nodes or leaf nodes.

A 'terminal' element is a leaf node in the tree structure of the grammar. 'Pizza' (208) is a non-optional leaf node; if the 'order' grammar is to be matched, the word 'pizza' must be matched. The vertical bars '|' designate grammar elements as alternatives, the use of any one of which will match a grammar element. In the rule <pizza_toppings>, 'cheese' (214), 'pepperoni' (216), and 'italian sausage' (218) are non-optional, alternative terminal elements. If the 'order' grammar is to be matched, the user much speak one of 'cheese,' 'pepperoni,' or 'italian sausage'.

The grammar terms in square brackets [ ] are optional. The square brackets in [<polite_phrase>] designate the 'polite_phrase' rule as an optional, non-terminal element, a branch node in the grammar tree. The terms of the <polite_phrase> (204) rule in square brackets therefore are 'optional terminals,' leaf nodes in the grammar tree which in this example form two optional alternative phrases (210, 212), each of which is composed of two optional alternative terminals or leaf nodes, respectively: [I] (220) [want] (222) and [give] (224) [me] (226).

Dynamically generating a vocal help prompt in a multimodal application according to embodiments of the present invention in a thin client architecture may be implemented with one or more voice servers, computers, that is, automated computing machinery, that provide speech recognition and speech synthesis. For further explanation, therefore, FIG. 3 sets forth a block diagram of automated computing machinery comprising an example of a computer useful as a voice server (151) in dynamically generating a vocal help prompt in a multimodal application according to embodiments of the present invention. The voice server (151) of FIG. 3 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to dynamically generate a vocal help prompt in a multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or another multimodal language, by providing responses to HTTP requests from X+V, SALT, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support dynamically generating a vocal help prompt in a multimodal application may be implemented in other ways as may occur to those of skill in the art, and all such ways are well within the scope of the present invention.

The voice server in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in dynamically generating a vocal help prompt in a multimodal application according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine which words presently can be recognized. In this example, expansion includes conjunction and disjunction, and the vertical bars '|' mean 'or.' An ASR engine processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole accepts utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user, including vocal help prompts. The VoiceXML interpreter administers such dialogs by processing the dialog instructions sequentially in accordance with a VoiceXML Form Interpretation Algorithm ('FIA') (193). The VoiceXML interpreter (192) and its FIA (193) in this example are improved to support dynamically generating a vocal help prompt in a multimodal application according to embodiments of the present invention by detecting a help-triggering event for an input element of a VoiceXML dialog; retrieving, from a source of help text, help text for an element of a speech recognition grammar; forming the help text into a vocal help prompt; and presenting the vocal help prompt through a computer user interface to a user.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Figure 3:
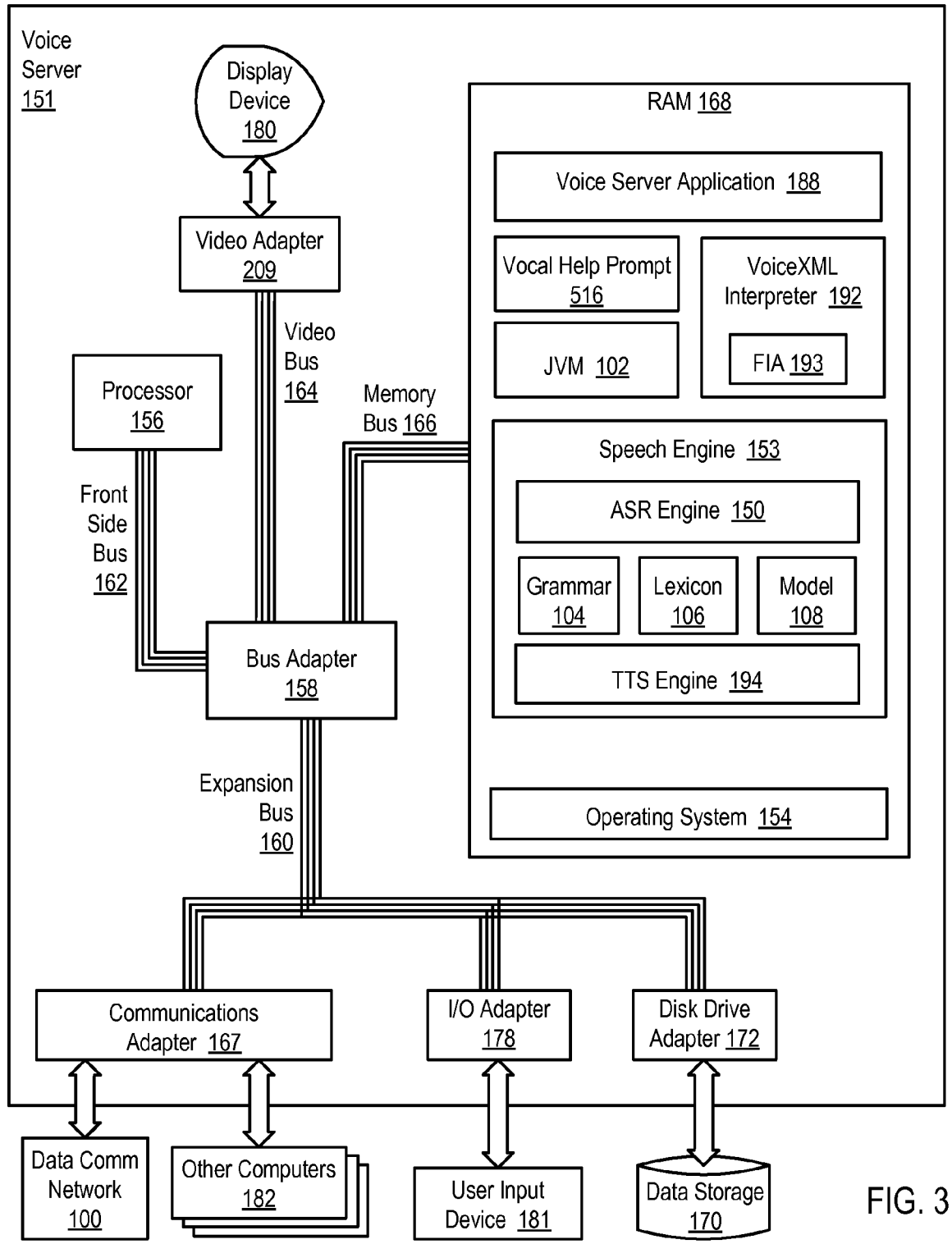
FIG. 3 sets forth a block diagram of automated computing machinery comprising an example of a computer useful as a voice server in dynamically generating a vocal help prompt in a multimodal application according to embodiments of the present invention.

Voice server (151) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 3 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 3 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically generating a vocal help prompt in a multimodal application according to embodiments of the present invention include modems for wired dial-up communications, Ethernet (IEEE 802.3) adapters for wired data communications network communications, and 802.11 adapters for wireless data communications network communications.

Figure 4:
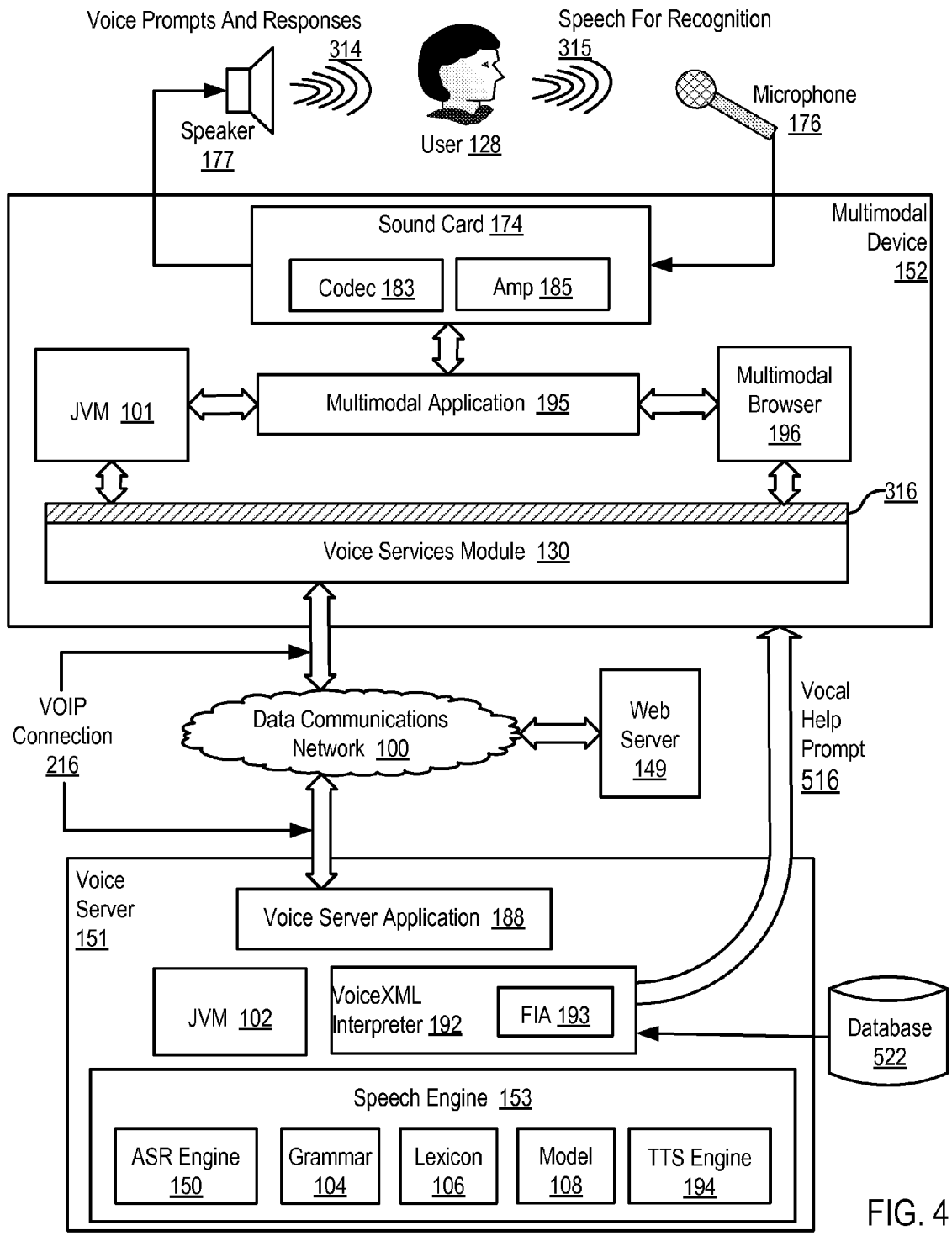
FIG. 4 sets forth a functional block diagram of exemplary apparatus for dynamically generating a vocal help prompt in a multimodal application according to embodiments of the present invention.

For further explanation, FIG. 4 sets forth a functional block diagram of exemplary apparatus for dynamically generating a vocal help prompt in a multimodal application in a thin client architecture according to embodiments of the present invention. The example of FIG. 4 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 4 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operates in a manner that is similar to the operation of the system of FIG. 3 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts—as well as voice prompts, including vocal help prompts according to embodiments of the present invention. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The system of FIG. 4 operates to dynamically generate a vocal help prompt in a multimodal application according to embodiments of the present application by detecting a help-triggering event for an input element of a VoiceXML dialog; retrieving, by the VoiceXML interpreter (192) from a source of help text, help text for an element of a speech recognition grammar; forming by the VoiceXML interpreter the help text into a vocal help prompt; and presenting by the multimodal application the vocal help prompt through a computer user interface to a user. Detecting a help-triggering event is carried out with the multimodal application (195) operating on a multimodal device (152) supporting multiple modes of interaction including a voice mode and one or more non-voice modes. The multimodal application typically contains no static help text. Examples of non-voice modes of interaction between a user and the multimodal application include keystrokes on a keyboard, mouse button clicks, mouse movements of a mouse, stylus input on a pressure sensitive pad, and so on, as will occur to those of skill in the art.

The multimodal application is operatively coupled to a VoiceXML interpreter. In this example, the operative coupling between the multimodal application and the VoiceXML interpreter is implemented with a VOIP connection (216) through a voice services module (130). The voice services modules is a thin layer of functionality, a module of computer program instructions, that presents an API (316) for use by an application level program in providing dialog instructions and speech for recognition to a VoiceXML interpreter and receiving in response voice prompts and other responses, including vocal help prompts according to embodiments of the present invention.

The voice services module provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

As mentioned above, text for use as help text in dynamically generating a voice help prompt can be retrieved from text associated with elements of the grammar, including non-terminal elements and terminal elements. The grammar elements form a tree structure, and non-terminal elements and terminal elements of a grammar are grammar elements represented as nodes in a grammar tree structure. The non-terminal elements represent branch nodes, and the terminal elements represent leaf nodes. The help text can be retrieved from the grammar (104) itself (remembering that none of the text in the grammar is specified by hard code as static help text), or help text can be retrieved from a database (522) from which the grammar was dynamically generated. Help text so retrieved can be formed into a vocal help prompt by concatenating help text associated with a non-terminal element of the grammar with help text associated with one or more terminal elements of the grammar.

Figure 5:
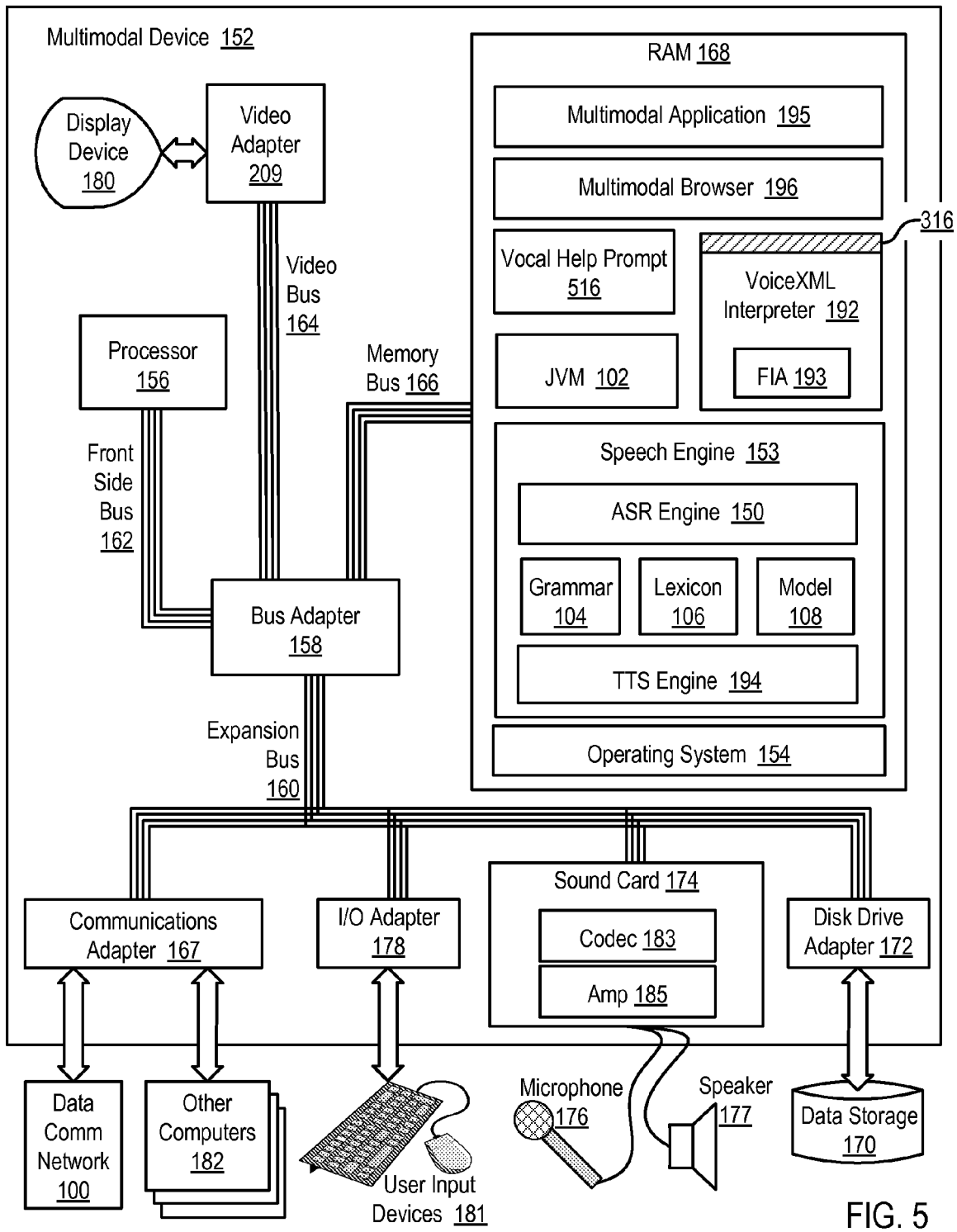
FIG. 5 sets forth a block diagram of automated computing machinery comprising an example of a computer useful as a multimodal device in dynamically generating a vocal help prompt in a multimodal application according to embodiments of the present invention.

Dynamically generating a vocal help prompt in a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 5 sets forth a block diagram of automated computing machinery comprising an example of a computer useful as a multimodal device (152) in dynamically generating a vocal help prompt in a multimodal application according to embodiments of the present invention. In a multimodal device implementing a thick client architecture as illustrated in FIG. 5, the multimodal device (152) has no connection to a remote voice server containing a VoiceXML interpreter and a speech engine. All the components needed for speech synthesis and voice recognition in dynamically generating a vocal help prompt in a multimodal application according to embodiments of the present invention are installed or embedded in the multimodal device itself.

The example multimodal device (152) of FIG. 5 includes several components that are structured and operate similarly as do parallel components of the voice server, having the same drawing reference numbers, as described above with reference to FIG. 3: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 5, the speech engine in the multimodal device of FIG. 3 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193). The VoiceXML interpreter (192) and its FIA (193) in this example are improved to support dynamically generating a vocal help prompt in a multimodal application according to embodiments of the present invention by detecting a help-triggering event for an input element of a VoiceXML dialog; retrieving, from a source of help text, help text for an element of a speech recognition grammar; forming the help text into a vocal help prompt; and presenting the vocal help prompt through a computer user interface to a user.

The speech engine (153) in this kind of embodiment, a thick client architecture, often is implemented as an embedded module in a small form factor device such as a handheld device, a mobile phone, PDA, and the like. An example of an embedded speech engine useful for dynamically generating a vocal help prompt in a multimodal application according to embodiments of the present invention is IBM's Embedded ViaVoice Enterprise. The example multimodal device of FIG. 5 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports dynamically generating a vocal help prompt in a multimodal application according to embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input, including dynamically generated vocal help prompts according to embodiments of the present invention.

In a further class of exemplary embodiments, the multimodal application (195) may be implemented as a Java voice application that executes on Java Virtual Machine (102) and issues calls through the VoiceXML API (316) for speech recognition and speech synthesis services. In further exemplary embodiments, the multimodal application (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

The multimodal device (152) in this example is configured to dynamically generate a vocal help prompt in a multimodal application according to embodiments of the present invention by detecting a help-triggering event for an input element of a VoiceXML dialog; retrieving, by the VoiceXML interpreter (192) from a source of help text, help text for an element of a speech recognition grammar; forming by the VoiceXML interpreter the help text into a vocal help prompt; and presenting by the multimodal application the vocal help prompt through a computer user interface to a user. Detecting a help-triggering event is carried out with the multimodal application (195) operating on the multimodal device (152) supporting multiple modes of interaction including a voice mode and one or more non-voice modes. The multimodal application typically contains no static help text. Examples of non-voice modes of interaction between a user and the multimodal application include keystrokes on a keyboard, mouse button clicks, mouse movements of a mouse, stylus input on a pressure sensitive pad, and so on, as will occur to those of skill in the art.

The multimodal application is operatively coupled to a VoiceXML interpreter. In this example, the operative coupling between the multimodal application and the VoiceXML interpreter is implemented through the VoiceXML interpreter API (316). The VoiceXML interpreter API (316) is a module of computer program instructions, that for use by an application level program in providing dialog instructions and speech for recognition to a VoiceXML interpreter and receiving in response voice prompts and other responses, including vocal help prompts according to embodiments of the present invention. The VoiceXML interpreter API (316) presents the same application interface as is presented by the API of the voice service module (130 on FIG. 4) in a thin client architecture. At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

As mentioned above, text for use as help text in dynamically generating a voice help prompt can be retrieved from text associated with elements of the grammar, including non-terminal elements and terminal elements. The grammar elements form a tree structure, and non-terminal elements and terminal elements of a grammar are grammar elements represented as nodes in a grammar tree structure. The non-terminal elements represent branch nodes, and the terminal elements represent leaf nodes. The help text can be retrieved from the grammar (104) itself (remembering that none of the text in the grammar is specified by hard code as static help text), or help text can be retrieved from a database (522) from which the grammar was dynamically generated. Help text so retrieved can be formed into a vocal help prompt by concatenating help text associated with a non-terminal element of the grammar with help text associated with one or more terminal elements of the grammar.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as all or most of the functionality for dynamically generating vocal help prompts according to embodiments of the present invention—is implemented on the multimodal device itself.

Figure 6:
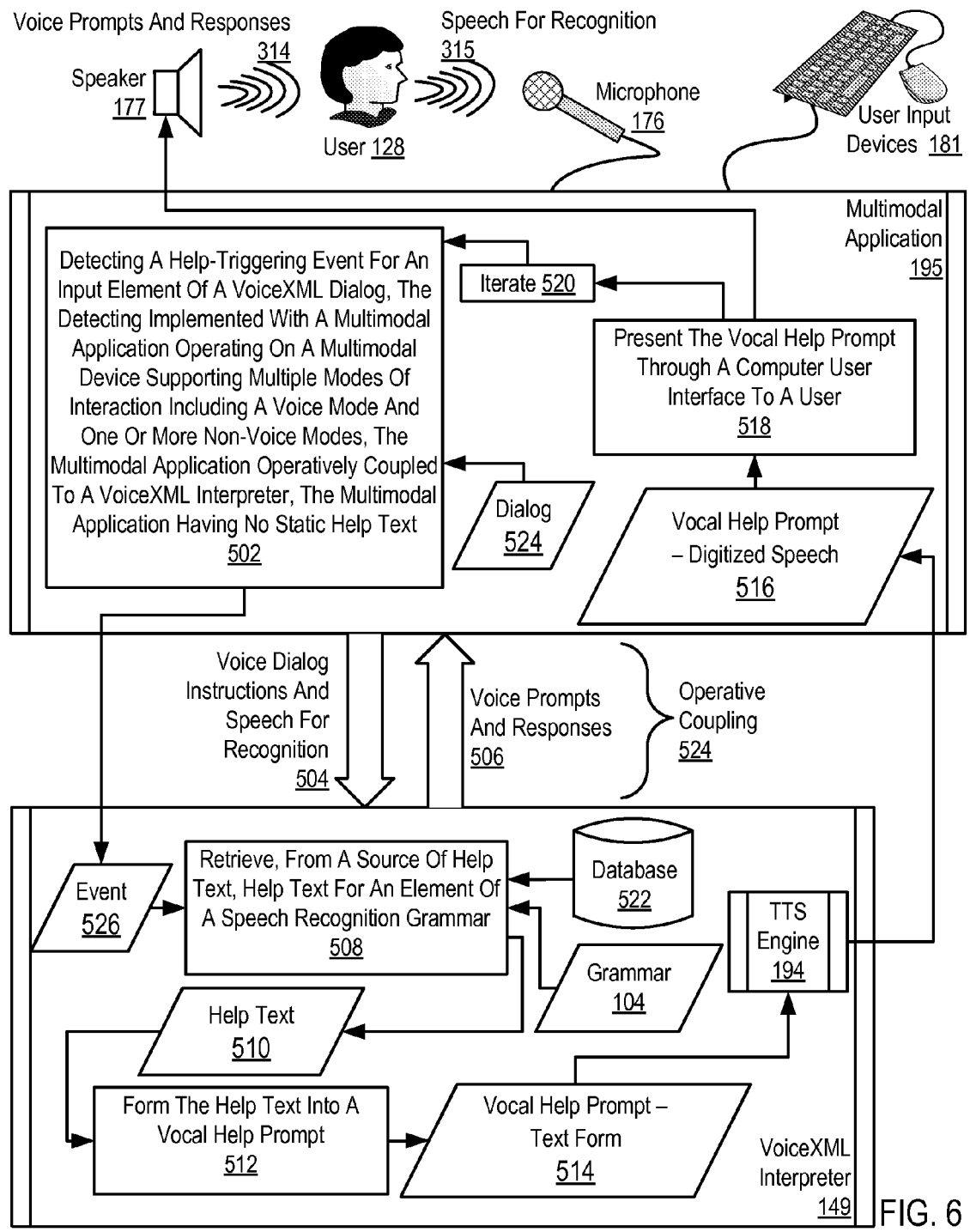
FIG. 6 sets forth a flow chart illustrating an exemplary method of dynamically generating a vocal help prompt in a multimodal application according to embodiments of the present invention.

For further explanation, FIG. 6 sets forth a flow chart illustrating an exemplary method of dynamically generating a vocal help prompt in a multimodal application according to embodiments of the present invention that includes detecting (502) a help-triggering event (526) for an input element of a VoiceXML dialog (524). Detecting the help-triggering event is implemented with a multimodal application (195) operating on a multimodal device supporting multiple modes of interaction including a voice mode and one or more non-voice modes of user interaction with the multimodal application. The voice mode is represented here with audio output through speaker (177) and audio input through microphone (176). Non-voice modes are represented with user input device (161), a keyboard and a mouse. The multimodal application is operatively coupled (524) to a VoiceXML interpreter (149). The operative coupling may be an API (316 on FIG. 5) when the multimodal application is implemented in a thick client architecture, and the operative coupling may include an API (316 on FIG. 4), a voice service module (130 on FIG. 4), and a VOIP connection (216 on FIG. 4) when the multimodal application is implemented in a thin client architecture. The multimodal application (195) has no static help text for use in generating vocal help prompts.

For further explanation, consider the following example X+V page:

```
<?xml version="1.0"?>
<html xmlns="http://www.w3.org/1999/xhtml"
  xmlns:vxml="http://www.w3.org/2001/vxml"
  xmlns:ev="http://www.w3.org/2001/xml-events">
<head>
  <title>Flight Information Query</title>
  <vxml:form id="flightinfo">
    <vxml:grammar id="flightgram" src="flightinfo.grxml"/>
    <vxml:initial name="initflightinfo">
      <vxml:prompt>Welcome to Flight Information. Where do you
       want to go?
      </vxml:prompt>
      <vxml:catch count="1 2 3" event="help nomatch noinput"
         autosrc="#flightgram"/>
    </vxml:initial>
    <vxml:field name="vdeptcity">
      <vxml:filled>
        <vxml:assign name="document.mainForm.from.value"
         expr="vdeptcity"/> </vxml:filled> </vxml:field>
```

-continued

```
<vxml:field name="vdestcity">
    <vxml:filled>
        <vxml:assign name="document.mainForm.to_loc.value"
            expr="vdestcity"/> </vxml:filled> </vxml:field>
<vxml:field name="vdate">
    <vxml:filled>
        <vxml:assign name="document.mainForm.depdate.value"
            expr="vdate"/> </vxml:filled> </vxml:field>
<vxml:field name="vseatclass">
    <vxml:filled>
        <vxml:assign name="document.mainForm.seatclass.value"
            expr="vseatclass"/> </vxml:filled> </vxml:field>
</vxml:form>
</head>
<body ev:event="load" ev:handler="#flightinfo">
    <form name="mainForm" method="post"
        onsubmit="http://www.flightinformation.com">
        <p> Please Enter an Airport City<br/>(ex: Boston
        Massachusetts)</p>
        <p>Departing from:</p>
        <input type="text" name="from" id="from" />
        <p>Arriving at:</p>
        <input type="text" name="to_loc" id="to_loc" />
        <p>Departure Date:</p>
        <input type="Text" id="depdate" name="depdate" />
        <p>Seating Class</p>
        <select id ="seatclass" name="seatclass">
            <option>Economy Class</option>
            <option>Business Class</option>
            <option>First Class</option>
        </select><br/>
        <input type="submit" name="Submit" id="Submit"
            value="Submit" />
    </form>
</body>
</html>
```

This X+V page is an example of a multimodal application entitled "Flight Information Query"—sometimes referred to in this specification as 'the Flight Information Query example.' The Flight Information Query example includes a VoiceXML dialog specified by the <vxml:form id="flightinfo"> tag and identified by id="flightinfo." The flightinfo dialog voice-enables an XHTML data input form identified by name="mainForm." MainForm has four data input fields named respectively "from," "to_loc," "depdate," and "seatclass." At load time, these four data input fields are named in a corresponding Document Object Model ('DOM') respectively as document.mainForm.from, document.mainForm.to_loc, document.mainForm.depdate, and document.mainForm.seatclass. MainForm identifes the VoiceXML "flightinfo" form as an event handler for the "load" event, so that when the Flight Information Query multimodal application is loaded into a multimodal browser, the VoiceXML "flightinfo" form is assigned to administer voice input for mainForm. The VoiceXML "flightinfo" form designates a speech recognition grammar for use in voice-enabling main-Form as:

```
<vxml:grammar id="flightgram" src="flightinfo.grxml"/>
```

The grammar is identified as id="flightgram" and located externally in a file named "flightinfo.grxml." In addition to its present ability to accept voice input, mainForm can still accept non-vocal input modes as well, keyboard input, mouse input, and so on—hence the designation of the Flight Information Query as a 'multmodal' application.

The multimodal application represented by the Flight Information Query example has no static help text for use in generating vocal help prompts. The Flight Information Query example does contain a <catch> element, an event handler for help-triggering events where traditionally, in prior art, static help text would be found:

```
<vxml:catch count="1 2 3" event="help nomatch noinput"
    autosrc="#flightgram"/>
```

In this <catch> element, however, there is no static help text. Instead, there is a new attribute named "autosrc" that identifies a source of help text from which a vocal help prompt may be dynamically generated according to embodiments of the present invention. The autosrc element in this example identifies its source of help text as the grammar "flightgram," designated by # as being specified in the same X+V document as the <catch> element. The "flightgram" grammar is specified in the same X+V document, not located in the same document. As mentioned, the "flightgram" grammar is located in an external file named "flightinfo.grxml."

The method of FIG. 6 also includes retrieving (508), by the VoiceXML interpreter (149) from a source of help text, help text (510) for an element of a speech recognition grammar. The help text (510) is text from a source of text that may be fashioned into a vocal help prompt despite the fact that none of the text is designated as help text, static help text, or a static help prompt. In the method of FIG. 6, the grammar (104) includes words that can be recognized by the VoiceXML interpreter (149), and the source of help text may be the words of the grammar itself. In the method of FIG. 6, the speech recognition grammar may have been previously dynamically generated using text stored in a computer database (522), and the source of help text may be additional text in the computer database from which the speech recognition grammar was generated. In the method of FIG. 6, retrieving (508) help text may be carried out by retrieving, for use as help text, text associated with elements of the grammar, including non-terminal elements and terminal elements. Text for use as help text may be 'associated' with elements of a grammar by being embedded in the grammar itself, or text may be associated with elements of the grammar according to the structure of a database from which a grammar was previously generated.

For further explanation, consider the following example grammar:

```
<grammar version="1.0" xmlns="http://www.w3.org/2001/06/grammar"
    tag-format="semantics/1.0" xml:lang="en-US" mode="voice"
    root="flight">
    <rule id="flight" scope="public">
        <item>
            <item repeat="0-1"> depart </item> from
            <item> <ruleref uri="#departAirport"/>
                <tag>"$.vdeptcity = $departAirport;"</tag>
            </item></item>
        <item repeat="0-1">
            <one-of>
                <item> to </item>
                <item> arrive at </item>
            </one-of>
            <item> <ruleref uri="#destAirport"/>
                <tag>"$.vdestcity = $destAirport;"</tag>
            </item></item>
        <item repeat="0-1">
            <item repeat="0-1"> depart </item> on
            <item> <ruleref uri="#departDate"/>
                <tag>"$.vdate = $departDate;"</tag>
            </item></item>
        <item repeat="0-1">
```

```
        <item> <ruleref uri="#seatClass"/>
            <tag>"$.vseatclass = $seatClass;"</tag>
            </item></item>
    </rule>
    <rule id="departAirport"> <ruleref uri="#airportList"/> </rule>
    <rule id="arrivalAirport"> <ruleref uri="#airportList"/> </rule>
    <rule id="airportList"><one-of>
        <item>West Palm Beach Florida</item>
        <item>Miami Florida</item>
        <item>Atlanta Georgia</item>
        <item>New York New York</item>
        <item>Las Vegas Nevada</item></one-of>
    </rule>
    <rule id="departDate"> <ruleref uri="#date"/> </rule>
    <rule id="date"> <ruleref uri="#day"/> <ruleref uri="#month"/>
    </rule>
    <rule id="day"> <one-of>
        <item> first </item><item> second </item>
        <item> third </item> ... </one-of>
    </rule>
    <rule id="month"><one-of>
        <item> January </item><item> Febuary </item>
        <item> March </item> ... </one-of>
    </rule>
    <rule id="seatClass"><one-of>
        <item> economy </item>
        <item> business </item>
        <item> first </item></one-of>
        class
    </rule>
</grammar>
```

This example grammar identifies words and phrases that can be matched by a VoiceXML interpreter with user speech. This particular example identifies words and phrases conveying airline flight information and will be referred to in this specification as 'the flight information grammar.' The flight information grammar is expressed in the XML format of the W3C's SRGS. The XML format is somewhat less concise than ABNF or JSGF. The flight information grammar, like other grammars described above, expresses a tree structure with a root, non-terminal branch nodes, and terminal leaf nodes. In the XML grammar format, optional non-terminals are represented with 'repeat' attributes set to "0-1." Non-optional, alternative terminals (at least one of which must be matched) are specified with <one-of> tags, as in the "airportList" rule, for example:

```
<rule id="airportList"><one-of>
    <item>West Palm Beach Florida</item>
    <item>Miami Florida</item>
    <item>Atlanta Georgia</item>
    <item>New York New York</item>
    <item>Las Vegas Nevada</item></one-of>
</rule>
```

In the method of FIG. 6, the grammar may include two or more alternative terminal elements, and retrieving (508) help text may be carried out by retrieving, for use as help text, text from a number of the alternative terminal elements, the number limited by a predefined maximum. In the flight information grammar, for example, the "airportList" rule includes only five destination airports, but this is only an example for explanation. As a practical matter, terminal elements in grammars for dynamically generating a vocal help prompt in a multimodal application according to embodiments of the present application may contain hundreds of alternatives. A list of destination airports is a good example; in many applications, such a list would contain hundreds of destination airports for a user to choose from. Dynamically generating a vocal help prompt may include reading the alternatives aloud to the user, the number of alternative to be read controlled by the a 'maximum alternatives' attribute, for example:

```
<rule id="airportList" alternatives="2">
```

From which a dynamically generated vocal help prompt may be, "from West Palm Beach Fla. or Miami Fla. to Atlanta Ga. or New York N.Y."

If an application author also provides a description, for example:

```
<rule id="airportList" description="Major US city name"
    alternatives="2">
```

Then a dynamically generated vocal help prompt may be, "from Major US city West Palm Beach Fla. or Miami Fla. to Major US city Atlanta Ga. or New York N.Y."

The method of FIG. 6 also includes forming (512) by the VoiceXML interpreter the help text into a vocal help prompt (514). In the method of FIG. 6, forming (512) the help text into a vocal help prompt may be carried out by concatenating help text associated with a non-terminal element of the grammar with help text associated with one or more terminal elements of the grammar. For example, here:

```
<item> from
    <item> <ruleref uri="#departAirport"/> </item>
</item>,
``` a non-terminal grammar element

```
<item> from ... </item>
``` forms a branch to a terminal rule:

```
<item> <ruleref uri="#departAirport"/> </item>.
```

The terminal rule specifies multiple terminal elements:

```
<rule id="airportList"><one-of>
    <item>West Palm Beach Florida</item>
    <item>Miami Florida</item>
    <item>Atlanta Georgia</item>
    <item>New York New York</item>
    <item>Las Vegas Nevada</item></one-of>
</rule>
```

In this example, concatenating help text associated with a non-terminal element of the grammar ("from") with help text associated with one or more terminal elements of the grammar:

```
<item>West Palm Beach Florida</item>
<item>Miami Florida</item>
``` may dynamically generate the vocal help prompt, "from West Palm Beach Fla. or Miami Fla."

Similarly, in this example:

```
<item> to
    <item> <ruleref uri="#destAirport"/> </item>
</item>,
``` concatenating help text associated with a non-terminal element of a grammar ("to") with help text associated with one or more terminal elements of the grammar:

```
<item>West Palm Beach Florida</item>
<item>Miami Florida</item>
``` may dynamically generate the vocal help prompt, "to West Palm Beach Fla. or Miami Fla."

In this example:

```
<item> on
    <item> <ruleref uri="#departDate"/> </item>
</item>,
``` concatenating help text associated with a non-terminal element of a grammar ("on") with help text associated with one or more terminal elements of the grammar:

```
<rule id="day"> <one-of>
    <item> first </item><item> second </item>
    <item> third </item> ... </one-of>
</rule>
<rule id="month"><one-of>
    <item> January </item><item> February </item>
    <item> March </item> ... </one-of>
</rule>
``` may dynamically generate the vocal help prompt, "on January first."

And in this example:

```
<item> seat class
    <item> <ruleref uri="#seatClass"/> </item>
</item>,
``` concatenating help text associated with a non-terminal element of a grammar ("seat class") with help text associated with one or more terminal elements of the grammar:

```
<rule id="seatClass"><one-of>
    <item> first </item>
    <item> business </item>
    <item> economy </item></one-of>
    class
</rule>
``` may dynamically generate the vocal help prompt, "seat class economy or business or first."

The method of FIG. 6 also includes iteratively carrying out the steps of the method upon occurrence of additional help-triggering events, generating multiple levels of help. Such multiple levels of help are sometimes referred to as 'tapered prompts.' Tapered prompts are those that may change with each attempt on the part of a user to speak utterances that match a speech recognition dialog. Information-requesting prompts may become terser under the assumption that the user is becoming more familiar with the task. Help messages may become more detailed under the assumption that the user needs more help. Or prompts can change just to make the interaction more interesting. The <catch> element that is the event handler for help-triggering events in the Flight Information Query example:

```
<vxml:catch count="1 2 3 4 5" event="help nomatch noinput"
    autosrc="#flightgram"/>
``` designates five levels of tapered prompts by count="1 2 3 4 5," with the first level to be implemented on the first occurrence of a help-triggering event, the second level on the second help-triggering event, and so on. The help-triggering events are specified by the <catch> element as "help," "nomatch," and "noinput." Examples of dynamically generated vocal help prompts for five such levels of tapered prompts include:

Level 1: "For example you may say from West Palm Beach Fla."

Level 2: "For example you may say from West Palm Beach Fla. to Miami Fla."

Level 3: "For example you may say from West Palm Beach Fla. to Miami Fla. depart on January first"

Level 4: "For example you may say from West Palm Beach Fla. to Miami Fla. depart on January first arrive on February second"

Level 5: "For example you may say from West Palm Beach Fla. to Miami Fla. depart on January first arrive on February second first class"

The method of FIG. 6 also includes presenting (518) by the multimodal application the vocal help prompt through a computer user interface to a user. When the VoiceXML interpreter (149) forms help text into a vocal help prompt, the vocal help prompt is expressed in text form, as described above, and then passed through a speech synthesizer, TTS engine (194) in this example, to produce a vocal help prompt in the form of digitized speech (516). The VoiceXML interpreter (149) then returns the vocal help prompt in the form of digitized speech (516) through its operative coupling (524) to the multimodal application (195) for presentation to the user (128). The multimodal application is operatively coupled (524) to a VoiceXML interpreter (149). The operative coupling may be an API (316 on FIG. 5) when the multimodal application is implemented in a thick client architecture, and the operative coupling may include an API (316 on FIG. 4), a voice service module (130 on FIG. 4), and a VOIP connection (216 on FIG. 4) when the multimodal application is implemented in a thin client architecture.

Exemplary embodiments of the present invention are described largely in the context of a fully functional computer system for dynamically generating a vocal help prompt in a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. A method for dynamically generating a vocal help prompt in a multimodal application, the method comprising:
   detecting a help-triggering event for an input element of a VoiceXML dialog, wherein the help-triggering event is selected from the group consisting of a request by a user for help, speech input that does not match any active grammar, and no speech input being received for a specified period of time, the detecting implemented with the multimodal application operating on a multimodal device supporting multiple modes of interaction including a voice mode and one or more non-voice modes, the multimodal application operatively coupled to a VoiceXML interpreter;
   retrieving, by the VoiceXML interpreter from a speech recognition grammar updated based on a changing information source, retrieved help text, wherein the retrieved help text includes first help text associated with at least one non-terminal element of the speech recognition grammar and second help text associated with at least one terminal element of the speech recognition grammar, wherein at least some of the retrieved help text is not hard-coded by a programmer of the multimodal application
   generating, by the VoiceXML interpreter, a vocal help prompt based, at least in part, on the first help text and the second help text; and
   presenting by the multimodal application the vocal help prompt through a computer user interface to a user.

2. The method of claim 1 wherein generating the vocal help prompt further comprises concatenating the first help text associated with the at least one non-terminal element of the grammar with the second help text associated with the at least one terminal element of the grammar.

3. The method of claim 1 wherein:
   the grammar includes two or more alternative terminal elements; and
   retrieving help text further comprises retrieving, for use as help text, text from a number of the alternative terminal elements, the number limited by a predefined maximum.

4. The method of claim 1 further comprising iteratively carrying out the steps of the method upon occurrence of additional help-triggering events, generating multiple levels of help.

5. The method of claim 1 wherein: the grammar includes words that can be recognized by the VoiceXML interpreter.

6. The method of claim 1 wherein: the speech recognition grammar was previously dynamically generated using text stored in a computer database.

7. Apparatus for dynamically generating a vocal help prompt in a multimodal application, the apparatus comprising:
   a computer processor; and
   a computer memory operatively coupled to the computer processor, the computer memory having disposed within it computer program instructions that, when executed by the computer processor, perform a method comprising:
      detecting a help-triggering event for an input element of a VoiceXML dialog, wherein the help-triggering event is selected from the group consisting of a request by a user for help, speech input that does not match any active grammar, and no speech input being received for a specified period of time, the detecting implemented with the multimodal application operating on a multimodal device supporting multiple modes of interaction including a voice mode and one or more non-voice modes, the multimodal application operatively coupled to a VoiceXML interpreter;
      retrieving, by the VoiceXML interpreter from a speech recognition grammar updated based on a changing information source, retrieved help text, associated with at least one non-terminal element of the speech recognition grammar and at least one terminal element of the speech recognition grammar, wherein the at least one non-terminal element includes a reference to at least one other element of the speech recognition grammar, wherein at least some of the help text is not hard-coded by a programmer of the multimodal application.
      forming, by the VoiceXML interpreter, the retrieved help text into a vocal help prompt; and
      presenting by the multimodal application the vocal help prompt through a computer user interface to a user.

8. The apparatus of claim 7 wherein forming the help text into a vocal help prompt further comprises concatenating help text associated with the at least one non-terminal element of the grammar with help text associated with the at least one terminal element of the grammar.

9. The apparatus of claim 7 wherein:
   the grammar includes two or more alternative terminal elements; and
   retrieving help text further comprises retrieving, for use as help text, text from a number of the alternative terminal elements, the number limited by a predefined maximum.

10. The apparatus of claim 7 further comprising iteratively carrying out the steps of the method upon occurrence of additional help-triggering events, generating multiple levels of help.

11. The apparatus of claim 7 wherein: the grammar includes words that can be recognized by the VoiceXML interpreter.

12. The apparatus of claim 7 wherein: the speech recognition grammar was previously dynamically generated using text stored in a computer database.

13. A non-transitory computer-readable recordable medium encoded with a plurality of instructions that, when executed by a computer perform a method of dynamically generating a vocal help prompt in a multimodal application, the method comprising:

detecting a help-triggering event for an input element of a VoiceXML dialog, wherein the help-triggering event is selected from the group consisting of a request by a user for help, speech input that does not match any active grammar, and no speech input being received for a specified period of time, the detecting implemented with the multimodal application operating on a multimodal device supporting multiple modes of interaction including a voice mode and one or more non-voice modes, the multimodal application operatively coupled to a VoiceXML interpreter;

retrieving, by the VoiceXML interpreter from a speech recognition grammar updated based on a changing information source, retrieved help text, wherein the retrieved help text includes first help text associated with at least one non-terminal element of the speech recognition grammar and second help text associated with at least one terminal element of the speech recognition grammar, wherein at least some of the retrieved help text is not hard-coded by a programmer of the multimodal application generating, by the VoiceXML interpreter, a vocal help prompt based, at least in part, on the first help text and the second help text; and presenting by the multimodal application the vocal help prompt through a computer user interface to a user.

14. The computer-readable recordable medium of claim 13 wherein generating the vocal help prompt further comprises concatenating the first help text associated with the at least one non-terminal element of the grammar with the second help text associated with the at least one terminal element of the grammar.

15. The computer-readable recordable medium of claim 13 further comprising iteratively carrying out the steps of the method upon occurrence of additional help-triggering events, generating multiple levels of help.

\* \* \* \* \*

UNITED STATES PATENT AND TRADEMARK OFFICE
CERTIFICATE OF CORRECTION

| | | |
|---|---|---|
| PATENT NO. | : 8,086,463 B2 | Page 1 of 1 |
| APPLICATION NO. | : 11/530930 | |
| DATED | : December 27, 2011 | |
| INVENTOR(S) | : Soonthorn Ativanichayaphong et al. | |

It is certified that error appears in the above-identified patent and that said Letters Patent is hereby corrected as shown below:

In the title page, item (73) should read:

(73) Assignees: Nuance Communications, Inc., Burlington, MA (US).

Signed and Sealed this
Twentieth Day of March, 2012

David J. Kappos
*Director of the United States Patent and Trademark Office*